United States Patent [19]

Clemens et al.

[11] 4,023,611
[45] May 17, 1977

[54] METHOD OF WELDING PIPES ONTO PRESSURE CONVEYING ELEMENTS, ESPECIALLY PIPE PLATES, PRESSURE CONTAINERS AND COLLECTORS

[75] Inventors: Kurt Clemens; Kurt Wollenweber; Hans Bruninghaus, all of Gummersbach; Konrad Nies, Wiehl, all of Germany

[73] Assignee: L. & C. Steinmuller GmbH, Gummersbach, Germany

[22] Filed: May 17, 1976

[21] Appl. No.: 686,953

[52] U.S. Cl. .................... 164/69; 164/110; 164/111; 164/112; 228/161; 228/183; 29/157.4; 29/527.6
[51] Int. Cl.² .................... B22D 19/04; B22D 31/00
[58] Field of Search .......... 164/108, 110, 111, 112, 164/69, 70, 94; 228/159, 160, 161, 162, 164, 175, 183, 186, 225, 165, 168, 169; 29/527.6, 157.3 C, 157.4

[56] References Cited

UNITED STATES PATENTS

| | | | |
|---|---|---|---|
| 1,692,818 | 11/1928 | Christoph | 228/183 X |
| 2,262,212 | 11/1941 | Stone | 228/160 X |
| 2,672,666 | 3/1954 | Enfer et al. | 164/69 X |
| 2,785,459 | 3/1957 | Carpenter | 228/168 X |
| 3,349,465 | 10/1967 | La Pan et al. | 228/175 X |
| 3,551,995 | 1/1971 | Marechal | 228/183 |
| 3,608,173 | 9/1971 | Watson et al. | 228/183 X |

FOREIGN PATENTS OR APPLICATIONS

| | | | |
|---|---|---|---|
| 44-15529 | 10/1969 | Japan | 29/157.3 C |
| 531,040 | 12/1940 | United Kingdom | 228/159 |
| 1,196,562 | 7/1970 | United Kingdom | 228/169 |

Primary Examiner—Ronald J. Shore
Attorney, Agent, or Firm—Walter Becker

[57] ABSTRACT

A method of connecting a pipe to a pressure conveying element, especially a pipe plate, a pressure container, and a collector, according to which the pressure conveying element is within the region of its intended connection with the pipe provided with lips. After the pipe provided on its inside and outside with a lip has been introduced into the pressure conveying element, the pipe is at its outer lip connected to the lip of the element by a complete through weld. Subsequently a centering bushing is introduced into the pipe and is clamped therein so that the outer surface of the centering bushing together with the inner surface of a bore in the conveying element—which bore is substantially coaxially arranged with regard to the pipe—forms a flat annular trough, whereupon the space between the outside surface of the centering bushing and the inner surface of the trough is filled with welding material. This trough is then deepened by extending its inner wall in upward direction, and the thus formed deeper trough is then filled with welding material, preferably up to the top surface of the pressure conveying element.

9 Claims, 4 Drawing Figures

METHOD OF WELDING PIPES ONTO PRESSURE CONVEYING ELEMENTS, ESPECIALLY PIPE PLATES, PRESSURE CONTAINERS AND COLLECTORS

The present invention relates to a method of connecting pipes to pressure conveying elements, such as pipe plates, pressure containers, collectors, and the like, according to which the connection is effected by a full gapless welding-through in the connecting area.

Known mechanical methods for the gapless welding-in of pipes into pipe plates cannot be employed with thick-walled pipes and with pipes made of several materials. Furthermore, methods have become known for a gapless welded-through connection of pipes to pipe plates which have the drawback that they are rather expensive and therefore unfavorable from a cost standpoint.

It is, therefore, an object of the present invention to provide a method of welding pipes to a pipe plate, a pressure container, a collector, or the like, which will assure a gapless welding-in or a full welding-through of the pipes in the connecting area by structurally simple means.

This object and other objects and advantages of the invention will appear more clearly from the following specification in connection with the accompanying drawings, in which.

Figure 1:
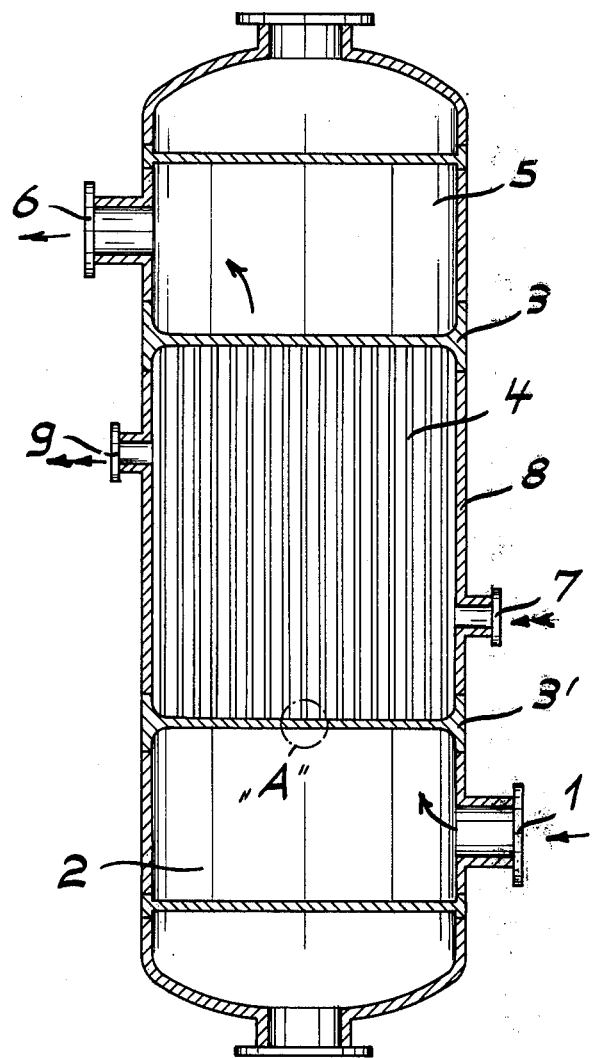
FIG. 1 is a diagrammatic view of a heat exchanger with pipes arranged between the pipe plates.
Figure 2:
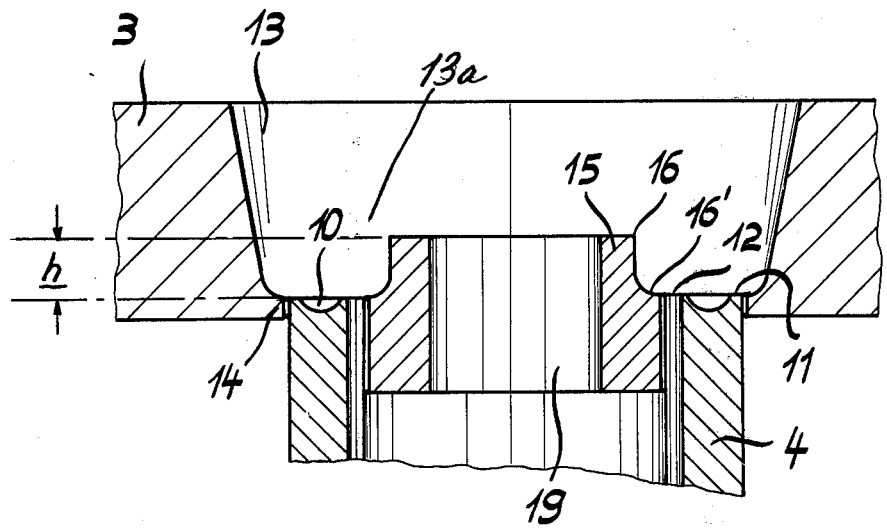
FIG. 2 illustrates on a larger scale than that of FIG. 1 the cutout designated in FIG. 1 with the character A.

The method according to the present invention is characterized primarily in that the pipe plates or elements in the connecting area of the pipes are provided with a lip-shaped contour and a pipe provided with a lip on the inside and outside thereof is then introduced whereupon the pipe is at the outer lip connected with the lip of the element by a full welding-through. Thereupon a centering bushing is introduced into the pipe and clamped thereto in the end region thereof whereupon the free space at the outer surface of the centering bushing and the inner surface of the bore of the element are filled-in with welding material and this filling-in is continued after an upwardly extending chamber has been defined by the wall of the inserted bushing and the element.

The advantage of such an arrangement consists in that also with a very close spacing of the pipes a safe welding-through will be obtained between the pipes and the pipe plate. A further advantage consists in that with pipes made of several materials, so-called compound pipes, a corrosion resistant connection is assured at the transition area of the pipe with the welding material.

By the insertion of a centering bushing, a ceramic ring or a centering mandrel in conformity with the root welding (Wurzelschweissen) method, the welding material will be prevented from flowing off into the opening. A building up of the welding material without the mentioned ceramic ring or centering mandrel is possible only under great difficulties and is very time consuming.

It is a further advantage of the present invention that it is possible, after removal of the ceramic ring or of the centering mandrel, to insert a drill provided with a pivot which drill is guided in the centering bushing and drills open the opening in conformity with the inner diameter of the pipe. In this connection, the centering bushing is drilled off and is drilled free at the transition area of the pipe with the welding material.

Still another advantage of the present invention is seen in the fact that damaged pipes can be replaced by a new pipe of the same outer diameter after the damaged pipe has been drilled open.

Referring now to the drawings in detail, the heat releasing medium enters the inlet hood 2 through a connection 1 and is through pipes 4, which are held in the elements 3 and 3' designed as pipe plates, conveyed to the outlet hood 5 through the connection 6. The heat absorbing medium passes through the connection 7 into the space defined by the pipe plates 3, 3' and the wall 8 and leaves the last mentioned space in heated-up condition through the connection 9. The connection of the pipes 4 in the pipe plates 3, 3' is effected by a full through-welding, which means that the welding material goes all the way through the gap formed by the two parts to be welded together. Furthermore, it is considered highly advantageous to build up the welding layer to the thickness of the pressure conveying element, i.e., in the specific example shown, the elements 3 and 3'. Inasmuch as the process is the same with each of the elements 3 and 3', the invention will be described with regard to element 3 only. In this connection, it is advisable to provide the pipe 4 with a round groove 10 to form the lips 11 and 12. The pipe plates 3, 3' are each provided with a tulip-shaped flute or groove 13 each of which ends in a lip 14. Pipe 4 is by means of its lip 11 introduced into the pipe plate in such a way the lip 11 and the respective lip 14 of the pipe plate can be connected by root welding. Thereupon the root welding for connecting lip 11 with lip 14 is effected.

A centering bushing 15 is now in a slip-free manner and with shoulder 16' flush with the top of the pipe 4 arranged in pipe 4. In this way, an annular trough 13a is built up having the height h. By filling this annular trough with welding material or by filling-in the welding gap created by the centering bushing 15 and lip 12 of pipe 4, the centering bushing is connected to the pipe 4 and plate 3.

Figure 3:
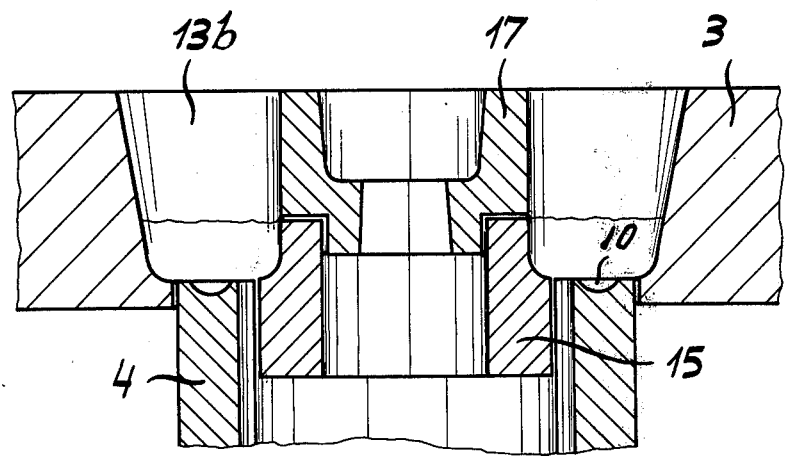
FIG. 3 shows a filled-in welding gap up to the upper edge of the centering bushing, a ceramic ring being inserted.
Figure 4:
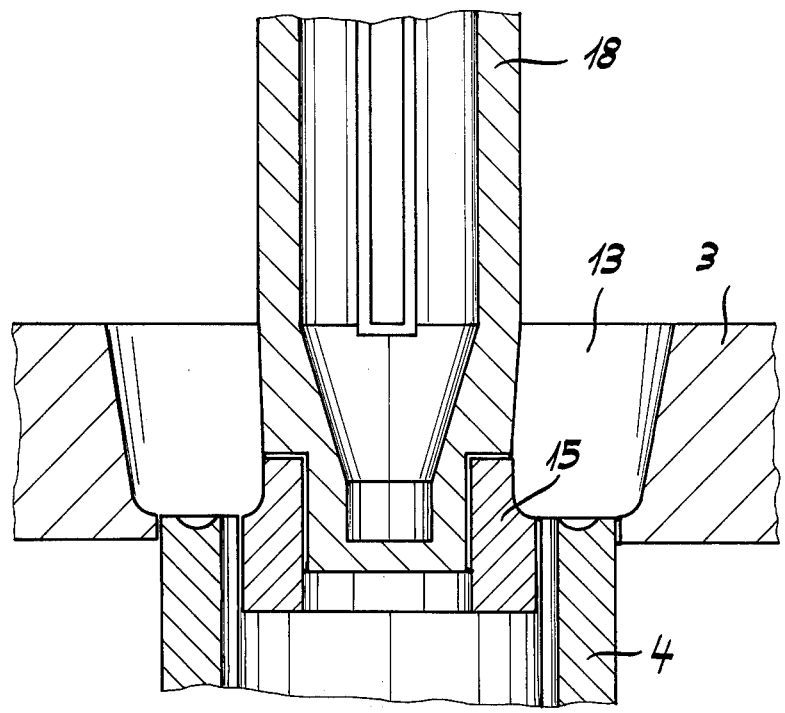
FIG. 4 shows a view similar to that of FIG. 3 but with the ceramic ring of FIG. 3 being replaced by a cooled mandrel.

Subsequently, the inner wall of trough 13a is extended upwardly by placing a ring, preferably a ceramic ring 17 on the centering bushing 15 (FIG. 3) or a water cooled mandrel 18 (FIG. 4) is placed on the centering bushing 15. The capacity of trough 13a has now increased to trough 13b, and trough 13b is now filled up with welding material. After the welding material has solidified, the ceramic ring 17 is destroyed or the water cooled mandrel 18 is withdrawn which mandrel consists of a material which does not bond to the additional material to be welded. Thus the material of the mandrel may be e.g. copper or silver.

For removing the centering bushing and the overhanging welding material, a drill provided with a pivot is moved into the cnetering bore 19 of the centering bushing 15 and the opening is drilled open to the inner diameter of pipe 4. The centering bore 15 is drilled off up to the shoulder 16' to such an extent that the centering bushing 15 becomes loose and can be pulled out of pipe 4. It will be appreciated that the drill used for this purpose has a relatively low pivot slidably fitting into bore 19 while the drill itself has a greater diameter, namely a diameter equalling the diameter of bore 4. The ceramic ring 17 may be destroyed by hammer blows and the pieces thereof withdrawn.

It is, of course, to be understood that the present invention is, by no means, limited to the specific showing in the drawings, but also comprises any modifications within the scope of the appended claims. Thus, it is also possible that the centering bushing, the ceramic ring or the mandrel have any other possible shape which may be advantageous in connection with the specific purpose they are used for.

What we claim is:

1. A method of applying and connecting a pipe to a pressure conveying element having a bore with a diameter slightly greater than the outer diameter of the pipe to be applied and to be connected to said pressure-conveying element and also having an opening adjacent to said bore with a diameter greater than that of said bore so as to form on said conveying element radially inwardly extending lip means, providing the inside and outside of the pipe to be applied within the region of its intended connection to said conveying element with inner and outer lips respectively, introducing the thus prepared pipe into said bore so that one end of said outer lip is substantially flush with said radially inwardly extending lip means, connecting said outer lip means to said lip by root-welding, preparing a centering bushing with a first section having an outer diameter slightly less than the inner diameter of said inner lip and having a second section of a lesser diameter and projecting beyond said first section, introducing the thus prepared centering bushing into said pipe so that said second section of said bushing projects upwardly into said opening of said pressure conveying element whereas that end of said first section which is adjacent to said second section is substantially flush with the adjacent end of the inner lip of said pipe, and filling the annular space between the inner wall of said opening and the outer peripheral wall surface of said second section with welding material for creating a welding connection between said inner lip with said bushing.

2. A method according to claim 1, which includes the step of increasing in upward direction the upward extension of said second section by a wall portion to thereby provide an annular trough of increased depth and filling the thus created trough of increased depth with additional welding material for establishing an all-through welded connection between said pipe and said pressure conveying element.

3. A method according to claim 2, in which as wall portion a ceramic ring is employed.

4. A method according to claim 2, in which as wall portion a water-cooled mandrel is employed.

5. A method according to claim 4, in which said water-cooled mandrel is made of a material not combining with said addition welding material.

6. A method according to claim 1, in which as material for said centering bushing a material is employed which is different from said welding material.

7. A method according to claim 1, in which as material for said centering bushing the same material as the welding material is employed.

8. A method according to claim 2, which includes the step of designing said centering bushing as guiding means for a cutting tool operable to remove overhanging welding material and to cut away said wall portion.

9. A method according to claim 2, which includes following the finish welding removing said centering bushing and said upward extension.

* * * * *